Sept. 16, 1947. K. P. SYNNESTVEDT 2,427,646
AIRCRAFT WITH TILTABLE ROTOR HAVING MOVABLE PIVOT
Filed July 27, 1943 2 Sheets-Sheet 1
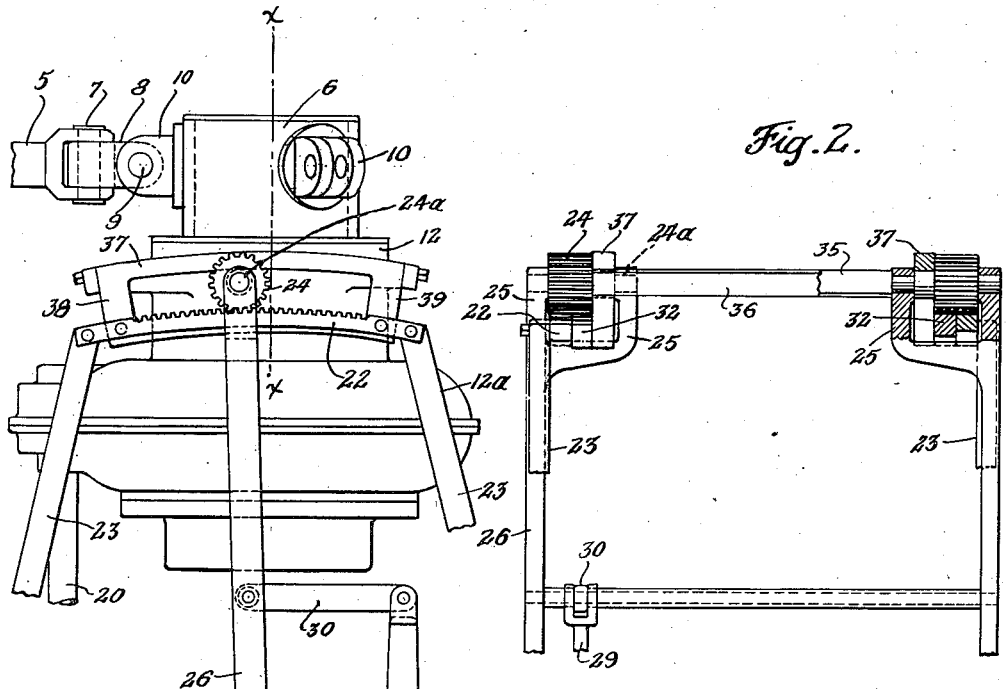
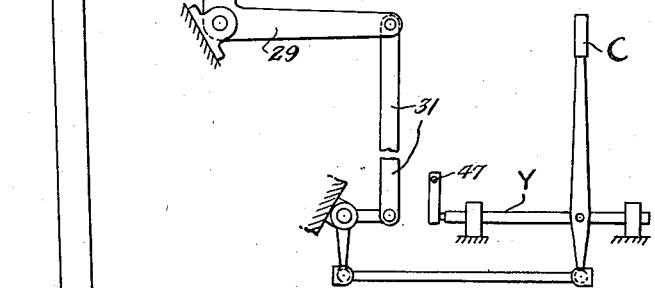
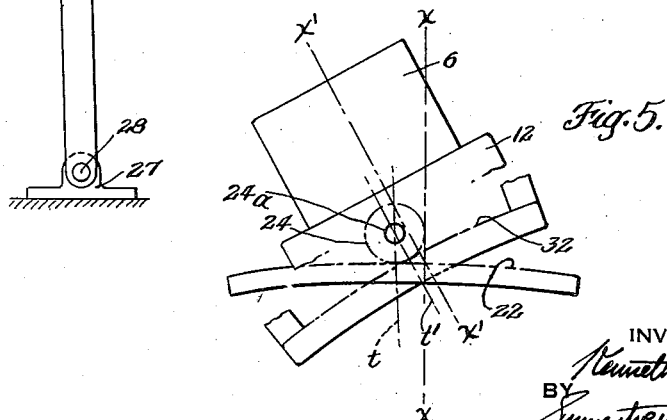
INVENTOR
Kenneth P. Synnestvedt
BY
Synnestvedt & Lechner
ATTORNEYS Sept. 16, 1947.  K. P. SYNNESTVEDT  2,427,646
AIRCRAFT WITH TILTABLE ROTOR HAVING MOVABLE PIVOT
Filed July 27, 1943  2 Sheets-Sheet 2

INVENTOR
Kenneth P. Synnestvedt
BY
Synnestvedt & Lechner
ATTORNEYS

Patented Sept. 16, 1947

2,427,646

UNITED STATES PATENT OFFICE 2,427,646

AIRCRAFT WITH TILTABLE ROTOR HAVING MOVABLE PIVOT

Kenneth P. Synnestvedt, Bryn Athyn, Pa., assignor to Autogiro Company of America, Philadelphia, Pa., a corporation of Delaware Application July 27, 1943, Serial No. 496,275

18 Claims. (Cl. 244—17)

This invention relates to rotative winged aircraft, and the invention is particularly concerned with a novel rotor arrangement, including special features incorporated in the mounting for the rotor hub and in a control system providing for shifting the lift line of the rotor for maneuvering. The invention is applicable to rotative winged aircraft of the type wherein the rotor is autorotationally actuated in flight, or where the rotor is mechanically driven during flight or in which both types of operation are provided for under various conditions.

Generally considered, the invention has in view structural and operational improvement of the rotor and of a rotor control system. Various of the individual objects and advantages are set out more fully herebelow.

One of the important objects of the invention is to improve rotor operation, from the standpoint of smoothness.

With respect to rotor control, the invention provides a novel control system wherein moments for control in pitch and roll are secured, respectively, by mechanisms of different types.

Before fully analyzing the foregoing and other objects and advantages, reference is first made to certain prior rotor structures and certain known operational characteristics, as follows:

As is disclosed in my copending application Serial No. 457,265, filed September 4, 1942, now Patent 2,376,523, issued May 22, 1945, in a rotor having "flappingly" pivoted blades, the rotor hub may be mounted for free floating or free tilting movement under the influence of aerodynamic forces. This achieves certain operational advantages, particularly where the individual blades of the rotor are pivotally connected with the hub by "flapping" pivots whose axes are radially offset from the hub axis. In a construction of this type, the physical axis of rotation of the hub may move to different positions and, under the aerodynamic forces present, the hub axis tends to maintain a position of coincidence with the lift line or vector.

Since the rotor hub is usually generally centralized above the center of gravity of the aircraft as a whole, and since sustaining rotors are customarily mounted to rotate about generally vertical axes, during vertical flight of a rotative winged aircraft, for instance vertical descent, the lift line of the rotor substantially coincides with the rotational axis of the hub, even if the rotor hub is not free to tilt. However, during translational flight of the aircraft, particularly when such flight is induced by a propulsive airscrew, the lift line of the rotor tends to angularly shift, so that it no longer coincides with the rotational axis of the hub, the extent of the excursion being different at different flight speeds. The displaced position of the lift line may, at any speed, be considered an average position for that speed, since there may be fluctuations (of varying degree) from such average position, at any given flight speed, periodically with rotation of the rotor, probably at a rate which is a multiple of rotor R. P. M., apparently depending upon the number of blades.

During translational flight, the direction of excursion of the lift line is partly to one side of the longitudinal axis of the aircraft, but principally forwardly of the center of gravity of the aircraft.

With the foregoing in mind, and in contrast to the arrangement of my copending application above mentioned, the present invention preferably provides a rotor hub mounting having freedom for tilting or floating only in a generally fore and aft plane, instead of in all directions. In this way provision is made for the physical axis of rotation of the hub to follow the excursions of the lift line in that direction in which the major component of the excursive movement takes place, the lateral component of the excursion being of quite small magnitude, as compared with the fore and aft component.

In addition to the foregoing, the present invention contemplates a novel form of rotor control which is applicable to the type of rotor in which the hub is mounted for free floating, regardless of whether that freedom is provided in only one plane or in all planes. According to this invention, provision is made for shifting the position of the axis or point about which the hub may float, without, however, introducing a corresponding bodily shift in the position of the rotor as a whole or of its hub. This is effective to set up control moments because of the fact that it results in a shifting of said point or axis (about which the hub may float) with respect to the position of the lift line of the rotor under any conditions of operation.

Although the foregoing type of control may be applied to a hub mounted for free tilting or floating in all directions (as disclosed in my copending application above mentioned), it has especial advantages when applied to a hub which is free to float in only one plane. Thus, as disclosed in the present application, wherein free floating of the hub is provided only in the fore and aft plane, the control system is arranged to shift the axis of the floating pivot in a fore and aft direction, thereby providing for control in pitch, i. e., nose-down or nose-up. In combination with this control, the invention further contemplates employment of differential blade pitch control operating to shift the lift line of the rotor laterally, i. e. transversely of the aircraft, whereby to set up control moments in roll.

The foregoing features of the control system therefore provide for control in pitch and control in roll by two different types of mechanisms. The control in roll (provided by periodic differential blade pitch control) may be incorporated in the hub in a relatively simple manner because of the very fact that it need operate only in one plane. On the other hand, because of the very fact that only a single floating pivot is provided for mounting the hub, the control mechanism by which the axis of the floating pivot is shiftable is also simplified.

The blade pitch control system, including the sense in which it functions will be pointed out more fully hereafter after consideration of the drawings.

How the foregoing objects and advantages are attained, together with others which will occur to those skilled in the art will appear more fully from the following description referring to the accompanying drawings in which—

Figure 1 is a side outline view of a rotor hub and mounting devices arranged in accordance with this invention, a portion of the root end of one blade and its mounting on the hub also being included, as well as a somewhat diagrammatic showing of parts of the rotor control system;

Figure 2 is a fragmentary part elevation and part vertical section of certain of the rotor hub mounting parts illustrated in Figure 1, this view being taken at right angles to the showing of Figure 1;

Figure 5 is a fragmentary diagrammatic outline of part of the rotor hub and mounting shown in Figure 1, illustrating, to an exaggerated degree, a forwardly tilted position to which the rotor has been assumed to have moved under a given aerodynamic condition.

Figure 3:
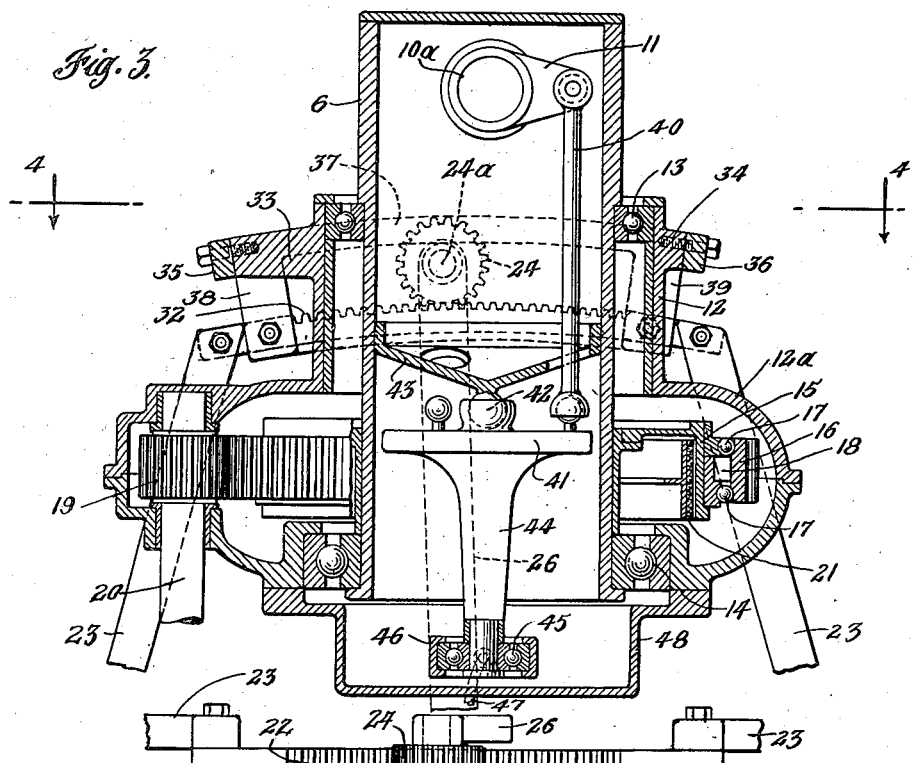
Figure 3 is a vertical sectional view through the rotor hub, to a larger scale.

Referring now to the drawings, the root end of one of the rotor blades is indicated in Figure 1 at 5. This blade is connected with the rotative hub part 6 by means of a "drag" pivot 7 cooperating with extension link 8, which latter is coupled by means of the "flapping" pivot 9 with a blade mounting part 10 having apertured ears to cooperate with pivot 9, the part 10 being journaled in the rotative hub 6 to provide freedom for twisting movement in a sense producing pitch change of the connected blade. The inner end of member 10 projects into the interior of the hub 6, as is indicated at 10a in Figure 3, the part 10a being provided with an arm 11 through which the pitch of the blade is controllable, by mechanism described more fully hereinafter. It is here noted that the complete mounting assembly for only one blade is illustrated in Figures 1 and 3, and further that it is assumed that in Figure 3 the rotor hub has turned 90° from the position indicated in Figure 1.

With regard to the number of blades to be incorporated in the rotor, it is contemplated that ordinarily at least three blades should be included, in order to insure proper action with respect to floating movement of the hub. For this purpose it is also of importance that the axes of the "flapping" pivots (9) be radially offset from the rotational axis of the hub, reasons for the importance of this offset being set out more fully in my copending application above referred to.

As will be seen from the drawings, the rotative part 6 of the hub is journaled in a non-rotative hub support 12 by means of bearings 13 and 14. Intermediate these bearings the rotative hub 6 carries a drum element 15 on which an external ring gear 16 is mounted, bearings 17—17 being provided for this purpose. The ring gear 16 and drum element 15 further cooperate with clutch rollers 18 to provide a free wheeling device interposed between the gear and the hub, whereby the rotor may freely overrun the drive.

Power may be delivered to the rotor through ring gear 16 either when starting the rotor on the ground in preparation for take-off (for instance in a machine of the type in which the rotor is usually autorotationally actuated), or during flight (as in a helicopter). For any rotor driving purposes, torque may be delivered to the gear 16 by means of a pinion 19 driven by a shaft 20. Shaft 20 preferably incorporates suitable flexible joints (accommodating floating movements of the hub) and extends downwardly to the body of the aircraft, at which point it may be coupled with a suitable power plant, such as an engine which may also be employed to drive a propulsive airscrew, as is known in this art. A manually controllable clutch is customarily included in the rotor drive shafting. Suitable flexible joints and manual clutch are shown in copending Cierva U. S. application Serial No. 645,985, filed December 6, 1932, now Patent 2,380,580, issued July 31, 1945, corresponding to British Patent No. 393,976.

The drum element 15 which is connected with the rotative part of the rotor for continuous rotation therewith may also serve to cooperate with a rotor brake indicated at 21. The rotor driving parts, and the brake are all suitably inclosed in an enlargement or casing 12a constituting a part of the non-rotative hub support 12.

According to the present invention the non-rotative hub support 12 is mounted for tilting movement in a fore and aft plane by mechanism described just below.

At each side of the hub an arcuate rack 22 is fixedly mounted, i. e., fixedly mounted on the body of the aircraft (not on the hub), as by means of struts 23—23 which are connected with any fixed part of the fuselage structure (not shown). At each side a pinion 24 is adapted to ride on rack 22, each pinion being mounted on a spindle 24a between prongs 25—25 of the forked end of a swinging link 26. Two such links are here shown and each is connected with a fixed part of the fuselage, as at 27, by means of a pivot 28, the axis of pivot 28 being coincident with the center of curvature of racks 22, so that the pinions 24 always maintain accurate intermeshing with the racks 22.

Therefore, as link 26 is moved fore and aft (see Figure 1) the pinions 24 are caused to rotate. This swinging movement of links 26 may be effected by any suitable control connection, such as the bell crank 29, link 30 and the push-pull connection 31 which latter may be extended downwardly into the fuselage for coupling with the usual control stick C in a manner such that fore and aft movement of the control stick effects swinging movement of the swinging links 26.

Another arcuate rack 32 is arranged at each side of the hub, these racks being secured to the non-rotative part of the hub (12) in the manner referred to just below.

Figure 4:
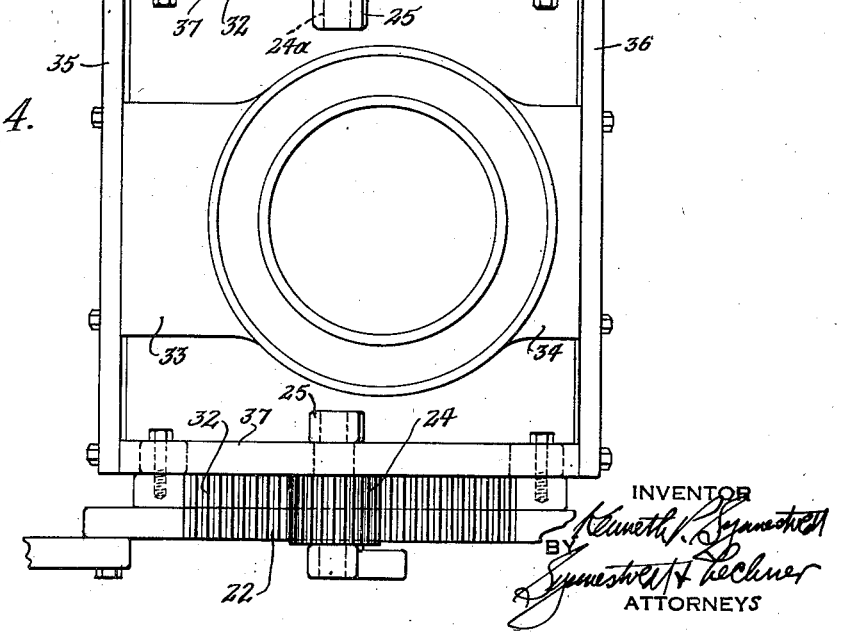
Figure 4 is a view taken as indicated by the section line 4—4 on Figure 3.

Referring to Figures 3 and 4 it will be noted that the hub part 12 is provided with projecting flange parts 33 and 34, each of which serves to support a transverse bar, one being indicated at 35 and the other at 36. At each side of the hub an arcuate track 37 is mounted between the adjacent ends of transverse bars 35—36, and these tracks have downwardly projecting lugs or brackets 38—39 to which the rack 32 is secured.

The lower side of the arcuate track 37 abuts a bearing sleeve mounted on the pinion shaft 24a, the pinion itself meshing with the rack 32, in addition to rack 22.

With the parts arranged as above described, the sustension thrust is transmitted from the blades to the rotative hub 6 and from there through the bearings 13—14 to the non-rotative hub support 12. The thrust is then transmitted to pinions 24 from racks 32. Finally the thrust is carried from the pinions to the pinion mounting shafts 24a and from there to the swinging links 26 and the fuselage structure. The arcuate tracks 37 serve to maintain proper interengagement or meshing of the pinions with the racks.

Because of the foregoing arrangement of parts, upon fore and aft movement of the control stick C, the swinging links 26 are caused to move forwardly or rearwardly and thereby rotate pinions 24 as they ride on the fixed racks 22. Since the pinions are also in engagement with racks 32 (carried by the hub), the rotation of the pinions caused by movement of the swinging links also changes the relative position between the pinions and the racks 32. In this way the location of each pinion is shifted with relation to the physical axis of rotation of the hub and thus also with relation to the position of the lift line of the rotor.

From analysis of the foregoing it will further appear that the hub is free to tilt in a fore and aft plane about an axis coinciding with the axes of pinions 24, for instance, as shown in Figure 5, although it will be understood that this is an exaggeration of the degree of tilt normally to be expected. When the control is adjusted the consequent shift in the position of the pinions results in a shifting of the axis about which the hub is free to float.

The arrangement thus provides for free floating of the hub in a fore and aft plane under all conditions, and further for shifting of the position of the floating axis with reference to the lift line of the rotor, so as to permit introduction of control moments in the fore and aft plane, thereby serving to nose the machine downwardly or upwardly.

Another point to be noted in connection with the foregoing is that the arrangement provides what might be termed "limited self-centering action" with respect to the free floating movement of the hub. The nature of this action is illustrated in Figure 5 in which the pinion 24 is shown in the same position of adjustment as in Figure 1. Rotor axis line $x$—$x$ on Figure 5 indicates the position of the rotor axis when in the same position of tilt as in Figure 1, Figure 5 also showing the hub in a forwardly tilted position, with its axis at $x'$—$x'$. Since racks 32 are fixed to the hub shell 12, and must tilt therewith, these racks crawl around the pinions 24 as the hub tilts, the rotative position of the pinions being fixed (with any given setting of the control). This crawling movement is illustrated by the shift in the point of tangency of the rack 32 to the pinion 24 from point intersected by line $t$ to the point intersected by line $t'$ (the relation between rack 22 and the pinion remaining fixed). It is also evidenced by the movement of rotor axis $x'$—$x'$ closer to the center of shaft 24a. This shift in the position of the hub axis relative to the axis of the pinions 24 is in a sense to set up a restoring moment or "self-centering" action, as above mentioned.

To further illustrate, assume a setting of the control (for instance for vertical descent) in which the axis of pinions 24 is brought to a position substantially intersecting the rotational axis of the hub (a position in which the axis of pinions 24 lies approximately in the transverse vertical plane containing the center of gravity of the aircraft and the hub axis $x$—$x$). If floating action now takes place, for instance a forward and downward tilting of the hub, the racks 32 crawl on pinions 24 in the sense which causes a shift of the hub axis and lift line forwardly of the center of the pinions 24. This, in turn, introduces a moment tending to cause the hub to return to its previous generally vertical position, in which the rotational axis substantially intersects the axis of pinions 24.

By the foregoing arrangement, therefore, the free floating of the hub is subject to "aerodynamic" damping, thereby tending to avoid excessive hub tilting movements.

In considering the operation of the control in pitch, i. e., control for nose up or nose down, it is contemplated that for generally vertical flight (either vertical ascent or vertical descent), the axis of pinions 24 will be adjusted so as to approximately intersect the rotational axis of the hub (when the latter is substantially vertical). As forward translational speed is acquired, it is contemplated that the longitudinal control shall be adjusted so as to move the axis of pinions 24 forwardly, thereby establishing a new mid-position of floating appropriate to the conditions encountered during translational flight, at which time, as hereinbefore pointed out, the lift line of the rotor tends to swing forwardly of the center of gravity of the aircraft.

Under any flight conditions (either vertical flight or high-speed translational flight), the longitudinal control is effective to introduce moments tending to nose the machine up or down, by virtue of shifting the axis about which the hub may freely float in the fore and aft plane.

Turning now to the control in roll, it is first pointed out that in Figures 1, 3 and 4, it is assumed that the lefthand side of the sheet is toward the front of the aircraft. In general, the control in roll is secured by imposing periodic differential pitch changes on the blades. Since longitudinal attitude (pitching) control is taken care of by the mechanism described above providing for shift of the position of the axis about which the hub is free to float in a fore and aft plane, the differential pitch control mechanism need be arranged to function only in one plane, i. e., in that plane appropriate for the introduction of lateral rolling moments.

As is fully brought out in copending application of Juan de la Cierva, Serial No. 698,372, filed November 16, 1933, now Patent 2,380,582, issued July 31, 1945, the effect of periodic differential pitch change with flappingly pivoted rotor blades is manifested generally in a plane at right angles to that plane in which the pitch of the blades attains the maximum increase and the maximum decrease. Therefore, to secure rolling moments, the points of maximum pitch increase and maximum pitch decrease should be reached approximately when the blades pass the fore-and-aft diameter of the rotor. The mechanism provided for this purpose is best illustrated in Figure 3 wherein it will be seen that the pitch control arm 11 of each blade is coupled by means of a link 40 with a tiltable member 41 mounted internally of the hub 6 by means of a ball and socket joint 42, one element of which is carried by a suitable support 43 appropriately carried inside of the hub. Member 41 has a downwardly projecting stem 44 carrying a bearing 45 which in turn cooperates with a ring 46. Parts 41 and 42 and the interconnected links 40 all rotate with the hub, but ring 46 is non-rotative and serves as a means for the attachment of one or more control elements, such as the Bowden control cable 47. The sheath of the control 47 may be fixed on an adjacent part of a non-rotative hub support, for instance on the cup 48, the internal control wire being extended for connection with the non-rotative ring 46.

When viewed as in Figure 3, it will be seen that the foregoing pitch control mechanism provides for transverse swinging of stem 44 (by operating Bowden control 47), this movement being in turn transmitted to the pitch control arms 11 through the medium of links 40. The sense of this pitch control is such that the maximum pitch increase or maximum pitch decrease of the blades is attainable either when the blades pass at the front of the machine or when the blades pass over the tail of the machine. With a rotor in which the direction of rotation is counter-clockwise when viewed from above, a lateral rolling moment to the left is secured by adjustment of the differential pitch control in that sense providing attainment of maximum pitch decrease as the blades pass at the front of the machine and maximum pitch increase as the blades pass at the rear of the machine. Conversely in a rotor rotating in the direction just stated, a banking moment to the right is secured by adjustment of the pitch control so that the blades attain maximum pitch increase as they pass at the front of the machine and maximum pitch decrease as they pass at the rear.

From the foregoing it will be seen that the controls in pitch and roll are secured by different mechanisms, operating to produce control moments in somewhat different ways. Both of the control systems, however, may be coupled to a common control organ such as usual wheel or stick C, the differential pitch control preferably being coupled to the stick in a manner providing for a banking moment to the left when the stick is moved to the left, and a banking moment to the right when the stick is moved to the right. This may be effected by attachment of Bowden cables 47 to an arm on the torque tube $y$ shown in Figure 1.

According to the invention an entirely new type of rotor control is provided, this control involving employment of a free floating hub, together with means of shifting the point or axis about which the floating may take place.

Moreover, the invention contemplates an arrangement providing for aerodynamic damping of free floating movements of a rotor hub, thereby avoiding excessive floating movements and increasing what might be termed "stability of floating."

In the embodiment of the invention illustrated, free hub floating has been provided only in that plane containing the major component of the excursion of the lift line which takes place during translational flight. By providing for free floating only in this one plane, the control in pitch (provided by shifting the floating axis) may be applied in a relatively simple manner.

I claim:

1. For an aircraft, a sustaining rotor comprising a rotative hub and a plurality of blades, each pivotally connected with the hub with freedom for swinging movements of the blades in a direction generally transverse the mean rotative path of travel of the blades, mechanism mounting the hub with freedom for tilting movement in at least one plane, and means for shifting the position of the axis of tilt of the hub relative to the axis of rotation thereof.

2. A construction in accordance with claim 1 in which the means for shifting the axis of tilt is arranged to shift said axis generally in a horizontal direction.

3. In an aircraft having a sustaining rotor incorporating a hub and a plurality of blades connected with the hub with freedom for at least some movement in the flapping sense, mounting mechanism for the rotor hub providing for free floating movement of the hub in at least one plane and including means effecting a progressive shift of the floating center, with respect to the axis of rotation of the rotor, upon floating movement of the hub, whereby to provide aerodynamic damping of said floating movement.

4. For an aircraft, a sustaining rotor comprising a hub and a plurality of blades each connected with the hub with freedom for swinging movements in a direction generally transverse the mean rotative path of travel of the blades about axes which are offset from the rotational axis of the hub, mounting mechanism for the hub including means providing for free tilting of the hub in at least one plane, and means for shifting the axis of tilt with respect to the rotational axis of the hub.

5. A construction in accordance with claim 4 in which said tilting axis extends generally transverse the aircraft and in which the means for shifting the tilting axis is effective to shift the same in a direction fore and aft of the aircraft.

6. A construction in accordance with claim 4 and further incorporating mechanism for imposing periodic differential pitch change of the blades during rotation of the rotor, including control connections constructed to accommodate hub tilting.

7. For an aircraft, a sustaining rotor comprising a hub and a plurality of blades connected with the hub with freedom for swinging movements in a direction generally transverse the mean rotative path of travel about axes which are offset from the rotational axis of the hub, mechanism for mounting the hub including pivot means providing freedom for tilting movement of the hub in a fore and aft plane, means for shifting said pivot means in a fore and aft direction with respect to the rotational axis of the hub, and means for imposing periodic differential pitch change of the blades during rotation of the rotor, including control connections constructed to accommodate hub tilting.

8. A construction in accordance with claim 7 in which the means for imposing periodic differential pitch change is effective to provide maximum pitch increase and maximum pitch decrease as the advancing and retreating blades pass the fore and aft axis of the aircraft, irrespective of hub tilting.

9. For an aircraft, a sustaining rotor incorporating a hub and at least three blades connected with the hub with freedom for swinging movements in a direction generally transverse the mean rotative path of travel of the blades about axes which are horizontally offset from the hub axis, in which construction, during translational flight, the lift vector tends to shift forwardly with reference to the physical axis of rotation of the hub, mounting mechanism for the hub including pivot means providing for free floating of the hub in a fore and aft plane about a transverse axis, controllable means for shifting the location of said pivot means and thus of the tilting axis for the hub with reference to the lift vector, and controllable means for imposing periodic differential pitch change on the blades in a sense such that maximum pitch increase is attained when the blades pass at the front of the aircraft and maximum pitch decrease when the blades pass at the rear, or in a sense such that maximum pitch decrease is attained when the blades pass at the front of the aircraft and maximum pitch increase when the blades pass at the rear.

10. For an aircraft, a sustaining rotor incorporating flappingly pivoted blades, mounting mechanism for the rotor providing freedom for the rotor to float to and rotate in different angular positions, and control mechanism including means providing for shifting in one plane the location of the axis about which the rotor may float and means for imposing periodic differential pitch change of the blades in a sense setting up control moments in a plane generally at right angles to said one plane, and operating connections coupled to the means for shifting the axis and to the pitch-changing means respectively to provide for the operation of one without detrimentally affecting the operation of the other.

11. A construction in accordance with claim 10 in which the control providing for shifting of the floating axis is arranged for shifting the same in a fore-and-aft direction to set up pitching moments, and in which the control for imposing periodic differential pitch change on the blades is arranged for imposing control moments in a transverse direction to introduce rolling moments.

12. In an aircraft having a sustaining rotor incorporating a hub and a plurality of blades connected with the hub with freedom for flapping movement about axes offset from the rotational axis of the hub, mounting means for the hub providing for free floating to and rotation in angularly different planes fore and aft of the aircraft, means for shifting the location of the axis about which the hub may float, said means being operative to shift said axis in a generally fore and aft direction whereby to introduce pitching moments, and pitch control mechanism operative on the blades to introduce rolling moments irrespective of the variable location of the hub floating axis.

13. For an aircraft, a sustaining rotor comprising an elongated aerofoil blade mounted to rotate about a generally upright axis and having means providing for swinging of said aerofoil in a direction generally transverse to a plane perpendicular to said axis, mechanism providing for angular tilting of said axis about a pivot point under the influence of aerodynamic forces acting on said blade, and means for shifting said pivot point relative to said axis.

14. In an aircraft, a bladed sustaining rotor mounted for effective tilting in one plane, blade pitch varying means cyclically operative and constructed to produce maximum pitch variation when the longitudinal blade axis lies substantially in said plane, a pilot's control member, and control connections from said member to the rotor constructed to affect said tilting when said control member is moved in one plane and constructed to effect said cyclic pitch variation when said control member is moved in a plane at right angles thereto, said control connections including means accommodating said tilting movements without detrimentally affecting said pitch variation.

15. In an aircraft having a bladed sustaining rotor adapted to compensate for or accommodate differential flight forces, pivot mechanism mounting the rotor for movement to shift the position of the rotor lift line with respect to the center of gravity of the aircraft, and means for altering pivot location with respect to and in a direction generally transverse to the rotor lift line.

16. In an aircraft having a bladed sustaining rotor adapted to compensate for or accommodate differential flight forces, pivot mechanism mounting the rotor for movement to shift the position of the rotor lift line with respect to the center of gravity of the aircraft, the rotor being free to move on the pivot mounting mechanism under the influence of aerodynamic forces, and means for altering pivot location with respect to and in a direction generally transverse to the rotor lift line.

17. In an aircraft having a bladed sustaining rotor adapted to compensate for or accommodate differential flight forces, the rotor incorporating a hub and pivot means connecting the rotor blades thereto, with at least some freedom for flapping movement, pivot mechanism mounting the rotor hub for movement to shift the position of the rotor lift line with respect to the center of gravity of the aircraft, and pilot operable means for altering mounting pivot location with respect to and in a direction generally transverse to the rotor lift line.

18. In an aircraft having a bladed sustaining rotor adapted to compensate for or accommodate differential flight forces and incorporating a hub adapted to rotate about an upright axis, pivot mechanism mounting the rotor for movement to shift the position of the rotor lift line with respect to the center of gravity of the aircraft, and means for altering pivot location with respect to the rotor hub.

KENNETH P. SYNNESTVEDT.

REFERENCES CITED

The following references are of record in the file of this patent:

UNITED STATES PATENTS

| Number | Name | Date |
| --- | --- | --- |
| 1,491,310 | Perrin | Apr. 22, 1924 |
| 2,021,470 | Upson | Nov. 19, 1935 |
| 2,352,404 | Pitcairn | June 27, 1944 |

FOREIGN PATENTS

| Number | Country | Date |
| --- | --- | --- |
| 393,976 | Great Britain | June 16, 1933 |